United States Patent Office 2,895,942
Patented July 21, 1959

2,895,942

POLYMERIC METHYL ISOPROPENYL KETONE

Leonard J. Rosen, East Orange, N.J., assignor to Celanese Corporation of America, New York, N.Y., a corporation of Delaware No Drawing. Application May 26, 1955
Serial No. 511,390

10 Claims. (Cl. 260—45.85)

This invention relates to polymeric materials and relates more particularly to polymeric methyl isopropenyl ketone.

It is an object of this invention to provide a novel and efficient process for the preparation of polymeric methyl isopropenyl ketone.

Another object of this invention is the preparation of homopolymers of methyl isopropenyl ketone which have light color and are resistant to darkening by heat.

Other objects of this invention will be apparent from the following detailed description and claims.

In accordance with one aspect of this invention methyl isopropenyl ketone is polymerized at an elevated temperature in stable aqueous emulsion in the presence of a water-soluble persulfate and dispersing agent, at an initial pH of 6 to 7.5. When the initial pH is controlled within this range the polymer produced is colorless. Advantageously the monomeric methyl isopropenyl ketone is added gradually to the heated aqueous medium during the period of polymerization. When this technique of gradual addition is employed, polymerization proceeds rapidly, very good yields of highly polymeric material are obtained, and the loss of monomeric material due to the formation of dimer is minimized. During polymerization the pH of the emulsion generally decreases by about 0.5.

The colorless product produced in the presence of a persulfate, as described above, has a tendency to darken when it is subjected to molding temperatures. In accordance with another aspect of this invention, this darkening can be greatly decreased by mixing the polymeric material with an alkaline material prior to molding.

In the polymerization process of this invention the water-soluble persulfate serves as a catalyst. Examples of suitable persulfates for use in the process of this invention are ammonium persulfate, potassium persulfate and other alkali metal persulfates such as sodium persulfate. The proportion of persulfate used is advantageously 0.05 to 1.0%, by weight, based on the monomer.

The amount of water used in the polymerization should be greater than the amount of methyl isopropenyl ketone. Best results are obtained when about 2 or 3 parts by weight of water are used per part of methyl isopropenyl ketone. It is often advantageous to employ deionized water for this purpose.

The pH of the emulsion undergoing polymerization is preferably regulated by the inclusion in the emulsion of a buffering agent. Examples of suitable buffering agents are sodium sulfite, sodium bicarbonate and sodium acetate. The amount of such buffering agent is preferably the minimum necessary to give the desired initial pH of 6 to 7.5.

The dispersing agent should be of such type and used in such amount as to produce a stable emulsion under the conditions of polymerization. Emulsifiers of the anionic type have been found to be most suitable for this purpose. A particularly desirable emulsifier is a mixture of a dioctyl sodium sulfosuccinate and sodium dodecyl benzene sulfonate, since it maintains the emulsion very stable even after practically all of the monomer has been converted to polymer.

The entire amount of monomeric methyl isopropenyl ketone may be mixed with the aqueous polymerization medium before reaction or, as stated, the monomeric methyl isopropenyl ketone may be added gradually to the heated aqueous medium and then further polymerized. It is found that the gradual addition technique results in the more rapid polymerization.

The rate of polymerization depends, of course, to a large extent on the temperature employed. A suitable range of temperature is about 50° to the boiling point of the mixture, which at atmospheric pressure is 81° C. A preferred range is from 65 to 75° C.

The polymerization process described above generally produces a polymer of relatively high molecular weight, for example, a polymer whose inherent viscosity is 0.8 or higher. For certain purposes, as for injection molding, it is desirable to produce a polymer having a somewhat lower molecular weight and a greater tendency to flow at elevated temperatures. To this end, modifiers of polymerization, e.g. long chain mercaptans such as normal dodecyl mercaptan, tertiary dodecyl mercaptan or mixed tertiary dodecyl, tetradecyl and hexadecyl mercaptans, may be incorporated into the aqueous polymerization mixture in amount sufficient to reduce the inherent viscosity of the polymer to about 0.3 or less. The inherent viscosity is $$\frac{ln\eta rel}{c}$$

measured on absolute acetone solution of the polymer, wherein there is 0.1 g. of polymer per 100 ml. of solution, the concentration (c) being expressed in grams per 100 ml. of solution.

It is desirable to carry out the polymerization reaction in the substantial absence of oxygen, using an inert atmosphere, such as an atmosphere of nitrogen or carbon dioxide, or a mixture of the two, for this purpose. When oxygen is not excluded the induction period prior to polymerization is relatively long and the reaction proceeds at a much slower rate.

The polymerization reaction may be terminated in any desired manner. For example, a dilute sodium chloride or other salt solution may be added to the emulsion to cause coagulation of the polymer. If desired the emulsion may be heated, as by injection of steam, after the addition of the salt.

After precipitation, the polymer is washed to remove residual emulsifier and salts and then treated with an alkaline material to effect a stabilization of the polymer. Examples of suitable compatible alkaline materials are magnesium acetate, sodium naphthenate, sodium acetate, alkaline salts of other fatty acids (e.g. "Ivory" flakes), and amines such as N,N,N',N-tetrakis-2-hydroxypropyl ethylenediamene. The polymer may be treated with the alkaline material in any suitable manner, as by mixing particles of the polymer with a dilute aqueous solution of the alkaline material, draining the solution from the polymer particles and then drying the polymer particles carrying films of the alkaline solution on their surfaces. The alkaline material may also be blended dry with particles of the polymer, or a mixture of a plasticizer and the alkaline material may be applied to the particles. The proportion of alkaline material thus incorporated into the polymer is advantageously in the range of about 0.1% to 4.0%, of the alkaline salt based on the weight of polymer. If desired other stabilizers such as organic tin complexes, e.g. the thio organic tin compound known as "Advance Stabilizer 17M," may be added.

The following examples are given to illustrate this invention further. All proportions are by weight unless otherwise specified.

Example I 100 parts of methyl isopropenyl ketone, 300 parts of deionized water, 1 part of "Aerosol OT" (an emulsifier comprising di-2-ethyl-hexyl sodium sulfosuccinate) 0.15 part of potassium persulfate ($K_2S_2O_8$), and 0.075 part of sodium sulfite are blended to form a mixture having a pH of 6.5 to 7.0. This mixture is maintained at a temperature of 78° C., with agitation, for 5 hours while a stream of nitrogen is passed over the mixture. The resulting emulsion of polymer is white. 180 parts of a 5% aqueous solution of sodium chloride are added to the emulsion, causing precipitation of fine particles of polymer, which are then washed with water to free them from emulsifier and salts, and dried in air at a temperature of 75° C. or less. The polymer is colorless.

Repetition of the same process except that sodium sulfite is omitted so that the initial pH is 5.0 to 5.5 results in a grey emulsion and a grey polymer.

Repetition of the same process except that sodium hydroxide is added to raise the initial pH of the reaction mixture to 9 to 10 results in a yellowish product.

Example II

Example I is repeated except that the temperature of polymerization is 65° C. and the polymerization is continued, with agitation, for 6.5 hours. A colorless polymer having an inherent viscosity of about 1.1 is obtained in 90% yield.

Example III

Example II is repeated except that the sodium sulfite is replaced by 0.16 part of sodium acetate and the pH is 6.0 to 6.5. A colorless polymer having an inherent viscosity of about 1.6 is obtained in 91% yield.

Example IV

Example II is repeated except that the original charge contains only 5 parts of methyl isopropenyl ketone, the balance being added dropwise at a uniform rate over a period of 4 hours, following which the mixture is maintained for 2.5 hours more, with agitation, at 65° C. A yield of 96% of a colorless polymer of inherent viscosity 1.1, is obtained.

Example V

Example IV is repeated except that 0.18 part of sodium acetate are used in place of the sodium sulfite, the initial pH being 6.0 to 6.5. The yield of colorless polymer, of inherent viscosity about 1.2, is 95%.

Example VI

Example IV is repeated except that 0.05 part of sodium bicarbonate is used in place of the sodium sulfite, the initial pH being 6.5 to 7.0. The yield of colorless polymer, of inherent viscosity about 1.15, is 95%.

Example VII

Example VI is repeated except that the amount of deionized water is 200 rather than 300 parts and the emulsifier used is a mixture of 1.5 parts of "Aerosol OT" and 1.5 parts of "Nacconol NRSF" (a salt-free sodium dodecyl benzene sulfonate). A very stable emulsion is produced and the yield of polymer is 98%.

Example VIII

Example I is repeated except that 1 part of n-dodecyl mercaptan is added to the polymerization mixture and the polymerization is carried out for 6 hours at 80° C. using 3 parts of the emulsifier of Example VII and 200 parts of water. The product has inherent viscosity of about 0.24.

Example IX

The undried polymer particles obtained according to Example I, after washing, are slurried with 50 times their weight of deionized water containing 1 gram per liter of magnesium acetate ($Mg(OOCCH_3)_2 \cdot 4H_2O$), then drained and dried at 65° C. On compression molding into 5 gram discs at 150° C. for 5 minutes the product is transparent and almost colorless. In contrast an identical product which has not been treated with the magnesium acetate becomes black when molded under the same conditions.

Example X

The undried polymer particles obtained according to Example I, after washing, are slurried with twice their weight of deionized water containing 2.8% sodium naphthenate (in the form of the commercial product known as "Nusope 33A"), based on the weight of the dry polymer. The particles are then drained and dried so that about 0.6% of sodium naphthenate, based on the weight of the dry polymer is deposited thereon. The results are similar to those described in Example IX. When the product is maintained at 180° C. for one hour only negligible discoloration is observed.

It is to be understood that the foregoing detailed description is merely given by way of illustration and that many variations may be made therein without departing from the spirit of my invention.

Having described my invention, what I desire to secure by Letters Patent is:

1. Process for the production of homopolymers of methyl isopropenyl ketone which comprises polymerizing methyl isopropenyl ketone in stable aqueous emulsion in an inert atmosphere in admixture with an emulsifying agent and in the presence of a catalyst system consisting essentially of a water-soluble persulfate in admixture with a buffering agent selected from the group consisting of sodium bicarbonate and sodium acetate at an initial pH of 6.0 to 7.5.

2. Process as set forth in claim 1 in which the emulsifier is a mixture of a dioctyl sodium sulfosuccinate and sodium dodecyl benzene sulfonate.

3. Process for the production of homopolymers of methyl isopropenyl ketone which comprises polymerizing methyl isopropenyl ketone in stable aqueous emulsion in an inert atmosphere in admixture with an emulsifying agent and in the presence of a catalyst system consisting essentially of a water-soluble persulfate in admixture with a buffering agent selected from the group consisting of sodium bicarbonate and sodium acetate at an initial pH of 6.0 to 7.5, precipitating and washing the resulting homopolymer and incorporating a stabilizing proportion of an alkaline material therein.

4. Process as set forth in claim 3 in which the alkaline material is magnesium acetate.

5. Process as set forth in claim 3 in which the alkaline material is sodium naphthenate.

6. Process as set forth in claim 3 in which the alkaline material is a sodium soap.

7. Process as set forth in claim 3 in which the alkaline material is N,N,N',N'-tetrakis-2-hydroxypropyl ethylene diamine.

8. Process as set forth in claim 1 in which monomeric methyl isopropenyl ketone is added gradually to said emulsion during the polymerization.

9. Process as set forth in claim 1 in which the temperature of the polymerization is in the range of about 50° C. to the boiling point of the emulsion.

10. Process as set forth in claim 3 in which said alkaline material is an alkaline salt of a metal and a fatty acid.

(References on following page)

References Cited in the file of this patent

UNITED STATES PATENTS

| | | |
|---|---|---|
| 2,005,295 | Meisenburg | June 18, 1935 |
| 2,088,577 | Conaway | Aug. 3, 1937 |
| 2,332,897 | D'Alelio | Oct. 26, 1943 |
| 2,406,684 | Heyd | Aug. 27, 1946 |
| 2,407,051 | Adelson | Sept. 3, 1946 |
| 2,462,354 | Brubaker et al. | Feb. 22, 1949 |
| 2,475,016 | De Nie | July 5, 1949 |
| 2,626,943 | Skeist et al. | Jan. 27, 1953 |